(12) United States Patent
Kurian

(10) Patent No.: US 10,601,813 B2
(45) Date of Patent: Mar. 24, 2020

(54) CLOUD-BASED MULTI-FACTOR AUTHENTICATION FOR NETWORK RESOURCE ACCESS CONTROL

(71) Applicant: BANK OF AMERICA CORPORATION, Charlotte, NC (US)

(72) Inventor: Manu J. Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 167 days.

(21) Appl. No.: 15/794,827

(22) Filed: Oct. 26, 2017

(65) Prior Publication Data

US 2019/0132303 A1 May 2, 2019

(51) Int. Cl.
*H04L 29/06* (2006.01)
(52) U.S. Cl.
CPC ......... *H04L 63/083* (2013.01); *H04L 63/068* (2013.01); *H04L 63/08* (2013.01); *H04L 63/0861* (2013.01); *H04L 63/102* (2013.01); H04L 63/0807 (2013.01); H04L 2463/082 (2013.01)
(58) Field of Classification Search
CPC . H04L 63/083; H04L 63/068; H04L 63/0861; H04L 63/102; H04L 63/08
See application file for complete search history.

(56) References Cited

U.S. PATENT DOCUMENTS

| | | | |
|---|---|---|---|
| 7,739,744 B2 | 6/2010 | Burch et al. | |
| 8,411,867 B2 | 4/2013 | Buer et al. | |
| 8,635,457 B2 | 1/2014 | Tuliani et al. | |
| 8,676,998 B2 | 3/2014 | Schneider | |
| 9,002,018 B2 | 4/2015 | Wilkins et al. | |
| 9,064,127 B2 | 6/2015 | O'Hare et al. | |
| 9,154,958 B2 | 10/2015 | Whitmyer, Jr. | |
| 9,350,536 B2 | 5/2016 | Sabin | |
| 9,390,288 B2 | 7/2016 | Gryb et al. | |
| 9,396,338 B2 | 7/2016 | Cabrera et al. | |

(Continued)

OTHER PUBLICATIONS

Xiaogang Wang et al., "Research on Cross-platform Unified Resource Access Control Management System," IEEE, pp. 96-101, 2017 (Year: 2017).*

(Continued)

*Primary Examiner* — Luu T Pham
*Assistant Examiner* — Canh Le
(74) *Attorney, Agent, or Firm* — Michael A. Springs

(57) ABSTRACT

A system that includes a plurality of cloud servers in signal communication with user devices and an authentication server. Each cloud server is configure to generate a cloud key that is uniquely linked with a user associated with a user device and the cloud server and send the cloud key to the user device. The authentication server is configured to receive a network resource access request comprising the cloud key from the user device, perform multi-factor authentication with the user associated with the user device, and identify a cloud server from among the plurality of cloud servers based on a user profile linked with the user. The authentication server is further configured to send a key validation request to the identified cloud server, receive a key validation response, determine whether the cloud key passes verification, and send a network resource access response to the user device.

14 Claims, 3 Drawing Sheets

(56) References Cited

U.S. PATENT DOCUMENTS

| | | | |
|---|---|---|---|
| 9,455,978 | B2 | 9/2016 | Kravitz et al. |
| 9,608,810 | B1 | 3/2017 | Ghetti et al. |
| 9,614,670 | B1 | 4/2017 | Ghetti et al. |
| 9,684,791 | B2 | 6/2017 | Cabrera et al. |
| 2007/0130473 | A1* | 6/2007 | Mazotas ............... H04L 63/083 713/183 |
| 2015/0207830 | A1* | 7/2015 | DeLuca ................ H04L 43/16 709/204 |
| 2015/0319174 | A1* | 11/2015 | Hayton ................ H04L 63/10 726/7 |
| 2015/0381621 | A1* | 12/2015 | Innes ..................... G06F 21/31 726/7 |
| 2017/0124292 | A1* | 5/2017 | Shafer .............. G06Q 10/06311 |
| 2017/0126685 | A1* | 5/2017 | Taylor .................... G06F 21/10 |
| 2017/0147796 | A1* | 5/2017 | Sardesai ................ G06F 21/10 |
| 2017/0359314 | A1* | 12/2017 | Mathias .............. H04L 63/0428 |
| 2019/0058992 | A1* | 2/2019 | Kurian ................. H04W 12/06 |

OTHER PUBLICATIONS

Asif Muhammad et al., Evaluation of OpeID-Based Double-Factor Authentication for Preventing Session Hijacking in Web Applications, Journal on Computers, vol. 7, No. 11, Nov. 2012, pp. 2623-2628. (Year: 2012).*

Duo Security, "Flexible Two-Factor Authentication," https://duo.com/assets/pdf/Duo-Security-Whitepaper.pdf, downloaded Oct. 25, 2017, 5 pages.

* cited by examiner

CLOUD-BASED MULTI-FACTOR AUTHENTICATION FOR NETWORK RESOURCE ACCESS CONTROL

TECHNICAL FIELD

The present disclosure relates generally to information security, and more specifically to a system using multi-factor authentication for network resource and data access control.

BACKGROUND

In a network environment, network devices are in data communication with other network devices within their network which allows data to be shared among the network devices in the network. Some of the technical challenges that occur when data is exchanged between network devices involve controlling data leakage, unauthorized access to data and network resources, and preventing malicious activities. Allowing network devices to communicate with other network devices leaves the network vulnerable to threats and poses several network security challenges. For example, malicious actors can steal an authorized user's information to gain access to network resources and data.

Conventional systems rely on using information (e.g. log-in credential or passcodes) that can be stolen from a user to gain access to network resources. For example, some systems are configured to allow a user to provide a user name and password to request access to a network resource, for example a data repository. In this example, the user's user name and password can be stolen and used by a malicious actor to gain access to network sources and/or sensitive data. As another example, some systems are configured to allow a user to use a token generator that is assigned to the user to generate a token for accessing network resources. In this example, the token generator is a portable device that can also be stolen and used by a malicious actor to gain access to network sources and/or sensitive data. These conventional systems, their network resources, and their data are vulnerable to attacks by malicious actors as a result of relying on just information that can be stolen from a user. Thus, conventional systems are unable to provide adequate network security.

It is desirable to provide a solution that offers increased network security while allowing data and network resources to be shared among different network devices in the network.

SUMMARY

Some of the technical challenges that occur when data is exchanged between network devices involve controlling data leakage, unauthorized access to data and network resources, and preventing malicious activities. Allowing network devices to communicate with other network devices in a network leaves the network vulnerable threats and poses several network security challenges. Conventional systems rely on using information (e.g. log-in credential or passcodes) that can be stolen from a user to gain access to network resources. As an example, a user's user name and password can be stolen and used by a malicious actor to gain access to network sources and/or sensitive data. As another example, a token generator may be stolen from a user and used by a malicious actor to gain access to network sources and/or sensitive data. These conventional systems, their network resources, and their data are vulnerable to attacks by malicious actors as a result of relying on just information that can be stolen from a user. Thus, conventional systems are unable to provide adequate network security.

The system described in the present application provides a technical solution that enables the system to provided increased network security while allowing data and network resources to be shared among different network devices in the network. The system is configured to employ cloud-based multi-factor authentication to protect the system's resources. The system uses cloud keys that are generated by a cloud server when a user device connects to the cloud server. The cloud keys generated by the cloud server are uniquely linked with the user and the cloud server that generates the cloud key which is the cloud server instance the user's user device is connected to. The user's user device can download the cloud key generated by the cloud server without the user knowing the identity of the cloud server. When the user uses the cloud key to request access to a network resource, an authentication server performs multi-factor authentication with the user to authenticate the user. The authentication server also identifies and queries the cloud server linked with the cloud key to validate the cloud key. The authentication server is configured to allow access to the requested network resource when both the user passes authentication and the cloud server validates the cloud key.

The cloud key provides additional complexity that increases network security because a malicious actor will need knowledge of which cloud server the user is currently connected to in order to use the cloud key. Using cloud keys provides an unconventional solution where the identify of the cloud server may be unknown to user, and therefore, this information cannot be stolen from the user. In a brute force attack, a malicious actor would have to have to pass multi-factor authentication using the user's information, obtain a cloud key, and try the cloud key with all possible cloud servers to gain access to network resources. This unconventional combination of requirements provides a technical improvement that increases the security of the system and improves data access control by using information that cannot be stolen from the user in conjunction with multi-factor authentication.

In some embodiments, cloud keys may only be valid for a predetermined amount of time. Using cloud keys that expire further increases network security by forcing a malicious actor to obtain a cloud key and to identify the correct cloud server the user is connected to before the cloud key expires. The large number of possible cloud servers results in an intractable problem for the malicious actor to gain access to network resources and/or data.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
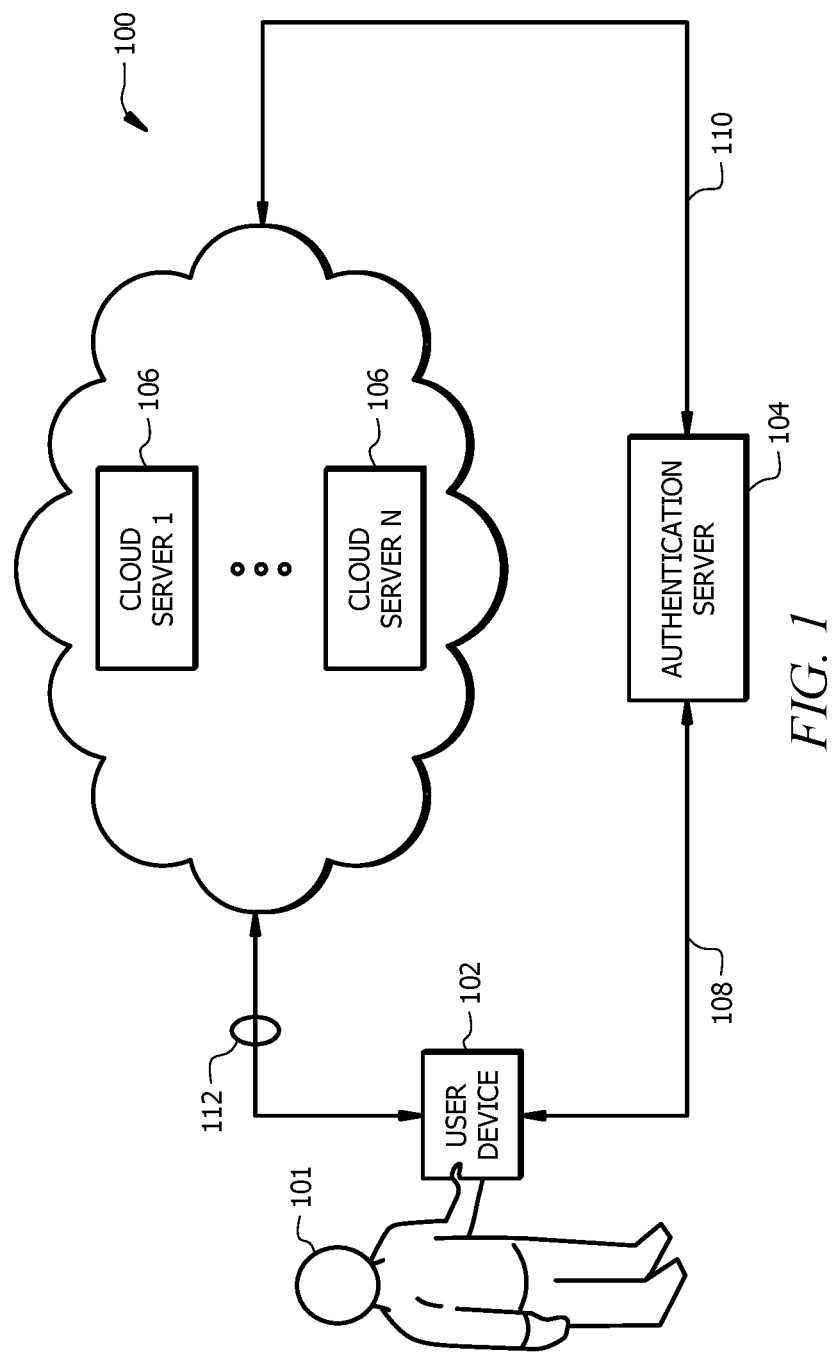
FIG. 1 is a schematic diagram of an embodiment of a system configured to employ cloud-based multi-factor authentication.

Conventional systems rely on using information (e.g. log-in credential or passcodes) that can be stolen from a user to gain access to network resources. For example, a user may provide a user name and password to request access to a network source, for example a data repository. In this example, the user's user name and password can be stolen and used by a malicious actor to gain access to network sources and/or sensitive data. As another example, a user may use a token generator that is assigned to the user to generate a token for access to network resources. In this example, the token generator is a device that can also be stolen and used by a malicious actor to gain access to network sources and/or sensitive data. These conventional systems, their network resources, and their data are vulnerable to attacks by malicious actors as a result of relying on just information that can be stolen from a user.

In contrast, the following disclosed system employs cloud-based multi-factor authentication to protect the system's resources. The system uses cloud keys that are generated by a cloud server when a user device connects to the cloud server. The cloud keys generated by the cloud server are uniquely linked with the user and the cloud server that generates the cloud key which is the cloud server instance the user's user device is connected to. The user's user device can download the cloud key generated by the cloud server without knowing the identity of the cloud server. When the user uses the cloud key to request access to a network resource, an authentication server performs multi-factor authentication with the user to authenticate the user. The authentication server also identifies and queries the cloud server linked with the cloud key to validate the cloud key. The authentication server is configured to allow access to the requested network resource when both the user passes authentication and the cloud server validates the cloud key.

The cloud key provides additional complexity that increases network security because a malicious actor will need knowledge of which cloud server the user is currently connected to in order to use the cloud key. Using cloud keys provides an unconventional solution where the identify of the cloud server that generated the cloud key may be unknown to user, and therefore, this information cannot be stolen from the user. In a brute force attack, a malicious actor would have to have to pass multi-factor authentication using the user's information, obtain a cloud key, and try the cloud key with all possible cloud servers to gain access to network resources. This unconventional combination of requirements provides a technical improvement that increases the security of the system and improves data access control by using information that cannot be stolen from the user in conjunction with multi-factor authentication.

In some embodiments, cloud keys may only be valid for a predetermined amount of time. Using cloud keys that expire further increases network security by forcing a malicious actor to obtain a cloud key and to identify the correct cloud server the user is connected to before the cloud key expires. The large number of possible cloud servers results in an intractable problem for the malicious actor to gain access to network resources and/or data.

FIG. 1 is a schematic diagram of an embodiment of a system 100 configured to employ cloud-based multi-factor authentication. The system 100 comprises one or more user devices 102, an authentication server 104, and a plurality of cloud servers or cloud server instances 106. The system 100 may further comprise any other suitable type and/or number of network devices (not shown). Examples of other network devices include, but are not limited to, web clients, web servers, user devices, mobile phones, computers, tablet computers, laptop computers, software as a service (SaaS) servers, databases, file repositories, file hosting servers, and/or any other suitable type of network device. The system 100 may be configured as shown or in any other suitable configuration.

The user device 102, authentication server 104, and the cloud servers 106 are members of a common network. The network may be any suitable type of wireless and/or wired network including, but not limited to, all or a portion of the Internet, an Intranet, a peer-to-peer network, the public switched telephone network, a cellular network, a private network, a public network, and a satellite network. The network may be configured to support any suitable communication protocols as would be appreciated by one of ordinary skill in the art upon viewing this disclosure.

Examples of the user device 102 include, but are not limited to, desktop computers, mobile phones, tablet computers, and laptop computers. The user device 102 is generally configured to communicate data with other network devices in the system 100. The one or more user devices 102 are in signal communication with the plurality of cloud servers 106 and the authentication server 104. In one embodiment, the user device 102 is configured to establish a connection with a cloud server 106 to access network resources. Examples of network resources include, but are not limited to, cloud services, applications, databases, file repositories, hardware, or any other suitable type of shared hardware or software resource. The user device 102 is further configured to receive a cloud key 112 generated by the cloud server 106 that may be used to request additional network resources. For example, the cloud key may be used to request network resource that require a higher level of security. An example of a user device 102 obtaining and using a cloud key 112 is described in FIG. 3.

A cloud key 112 is a tokenized key that is uniquely linked with the user 101 and the cloud server 106 that generates the cloud key 112 which is the cloud server instance that is connected to the user's 101 user device 102. In one embodiment, the user's 101 user device 102 can download the cloud key 112 generated by the cloud server 106 without the user 101 knowing the identity of the cloud server 106. The cloud key 112 may be received or downloaded from the cloud server 106 in any suitable file format. In some embodiments, cloud keys 112 may only be valid for a predetermined amount of time. For example, the cloud key 112 may be configured to expire after a predetermined amount of time has elapsed. Once a cloud key 112 expires, the user 101 may receive or request another cloud key 112 from the cloud server 106.

In one embodiment, the user device 102 can copy the cloud key 112 onto a portable external device such as a Universal Serial Bus (USB) drive. The user 101 may copy the cloud key 112 from the user device 102 onto a portable external device that can be used by the user 101 to request access to additional network resources. For example, the user 101 may copy the cloud key 112 onto a USB drive that can be inserted into another network device to request access to data and/or access to the network device.

In one embodiment, the cloud servers 106 are network devices (e.g. servers) configured to implement virtual machines that provide an operating system and/or application environment for user devices 102. Cloud servers 106 may be located in different geographical locations than that the authentication server 104 and/or user devices 102. For example, cloud servers 106 may be located in a remote data center that is in a different physical location than the user devices 102 and the authentication server 104. In some embodiments, cloud servers 106 may be operated and/or managed by a third-party. The plurality of cloud servers 106 may comprise any suitable number of cloud servers 106.

Once a cloud server 106 established a connection with a user device 102, the cloud server 106 is configured to provide network resources (e.g. applications, memory, and processing capabilities) to the user device 102. In some instances, a virtual machine instance provided by a cloud server 106 may also be referred to as a cloud server instance. The cloud servers 106 are further configured to generate a cloud key 112 for a user device 102 that is uniquely linked with the user 101 and the cloud server 106 that is connected to the user device 102. An example of a cloud server 106 generating and validating a cloud key 112 is described in FIG. 3.

The authentication server 104 is in signal communication with the one or more user devices 102 and the plurality of cloud servers 106. In one embodiment, the authentication server 104 is configured to use different channels to communicate with the one or more user devices 102 and the plurality of cloud servers 106. For example, the authentication server 104 may be configured to communicate with a user device 102 using a first channel (e.g. a user channel 108) and to communicate with a cloud server 106 using a different channel (e.g. an authentication channel 110). Examples of channel types include, but are not limited to, wireless channels (e.g. bandwidth channels), ports, and wired connections. Using different channels to communicate with the one or more user devices 102 and the plurality of cloud servers 106 provides additional network security in the event that one of the communication channels becomes compromised. A malicious actor would need to compromise all of the communication channels to extract a sufficient amount of information to gain access to network resources.

The authentication server 104 is configured to facilitate cloud-based multi-factor authentication to determine whether a user device 102 is able to access a requested network resource. The authentication server 104 is configured to authenticate a user 101 using multi-factor authentication. The authentication server 104 is also configured to identify and query a cloud server 106 linked with a cloud key 112 provided (e.g. sent) by the user device 102 to validate the cloud key 112. The authentication server 104 is configured to allow access to the requested network resource when the user 101 passes authentication and the cloud server 106 validates the cloud key 112. An example of an authentication server 104 performing cloud-based multi-factor authentication using a cloud key 112 is described in FIG. 3.

The authentication server 104 is further configured to manage user profiles linked with different users 101. A user profile may comprise information that includes, but is not limited to, location history, biometric information, personal information, employment information, and connectivity information (e.g. cloud server 106 connection history). For example, a user profile may include a name, an employee number, a work address, a home address, finger print scan, and information about which cloud server 106 the user 101 has most recently connected to. In other examples, a user profile may include any other suitable type and/or configuration of information. In one embodiment, the user profile is an active user profile that evolves over time. For example, an active user profile may identify behavior patterns or trends for a user 101 based on data collected by the authentication server 104 and/or the cloud server 106. An active user profile allows the authentication server 104 to identify anomalies in a user's 101 behavior, which may indicate malicious or suspicious activity. The authentication server 104 is configured to receive user profile updates from a cloud server 106 once the cloud server 106 connects to a user device 102. In one embodiment, the user profile update comprises information indicating a connection between a user device 102 and a cloud server 106. The user profile update may transmitted using any suitable format and/or type of message. An example of an authentication server 104 receiving and updating a user profile is described in FIG. 3.

Figure 2:
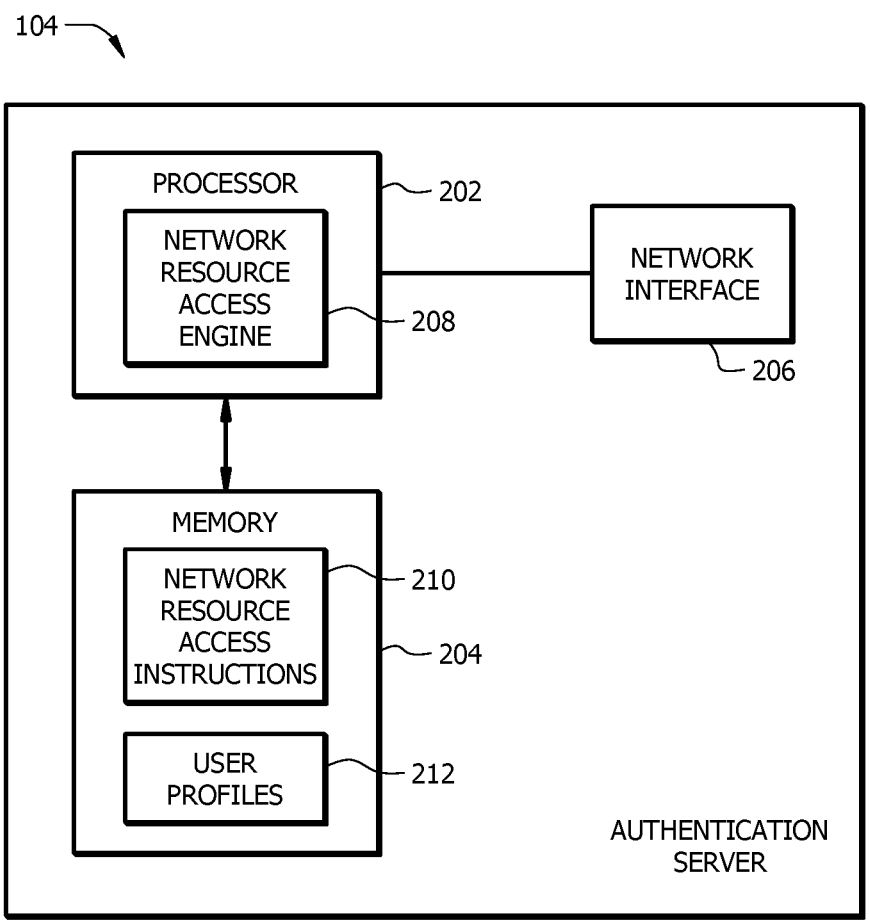
FIG. 2 is a schematic diagram of an embodiment of an authentication server.

FIG. 2 is a schematic diagram of an embodiment of an authentication server 104. The authentication server 104 comprises a processor 202, a memory 204, and a network interface 206. The authentication server 104 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a network resource access engine 208. In an embodiment, the network resource access engine 208 is implemented using logic units, FPGAs, ASICs, DSPs, or any other suitable hardware.

In one embodiment, the network resource access engine 208 is configured to facilitate cloud-based multi-factor authentication to determine whether a user device 102 is able to access a requested network resource. The network resource access engine 208 is configured to authenticate a user 101 using multi-factor authentication. The network resource access engine 208 is also configured to identify and query a cloud server 106 linked with a cloud key 112 provided by the user device 102 to validate the cloud key 112. The network resource access engine 208 is configured to allow access to the requested network resource when both the user 101 passes authentication and the cloud server 106 validates the cloud key 112. An example of an network resource access engine 208 performing cloud-based multi-factor authentication using a cloud key 112 is described in FIG. 3.

The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise ROM, RAM, TCAM, DRAM, and SRAM. The memory 204 is operable to store network resource access instructions 210, user profiles 212, and/or any other data or instructions. The network resource access instructions 210 comprise any suitable set of instructions, logic, rules, or code operable to execute the network resource access engine 208. The user profiles 212 are configured similar to the user profiles described in FIG. 1.

The network interface 206 is configured to enable wired and/or wireless communications. The network interface 206 is configured to communicate data through the system 100 and/or any other system or domain. For example, the network interface 206 may be configured for communication with a modem, a switch, a router, a bridge, a server, or a client. The processor 202 is configured to exchange (i.e. send and receive) data over the network using the network interface 206.

Figure 3:
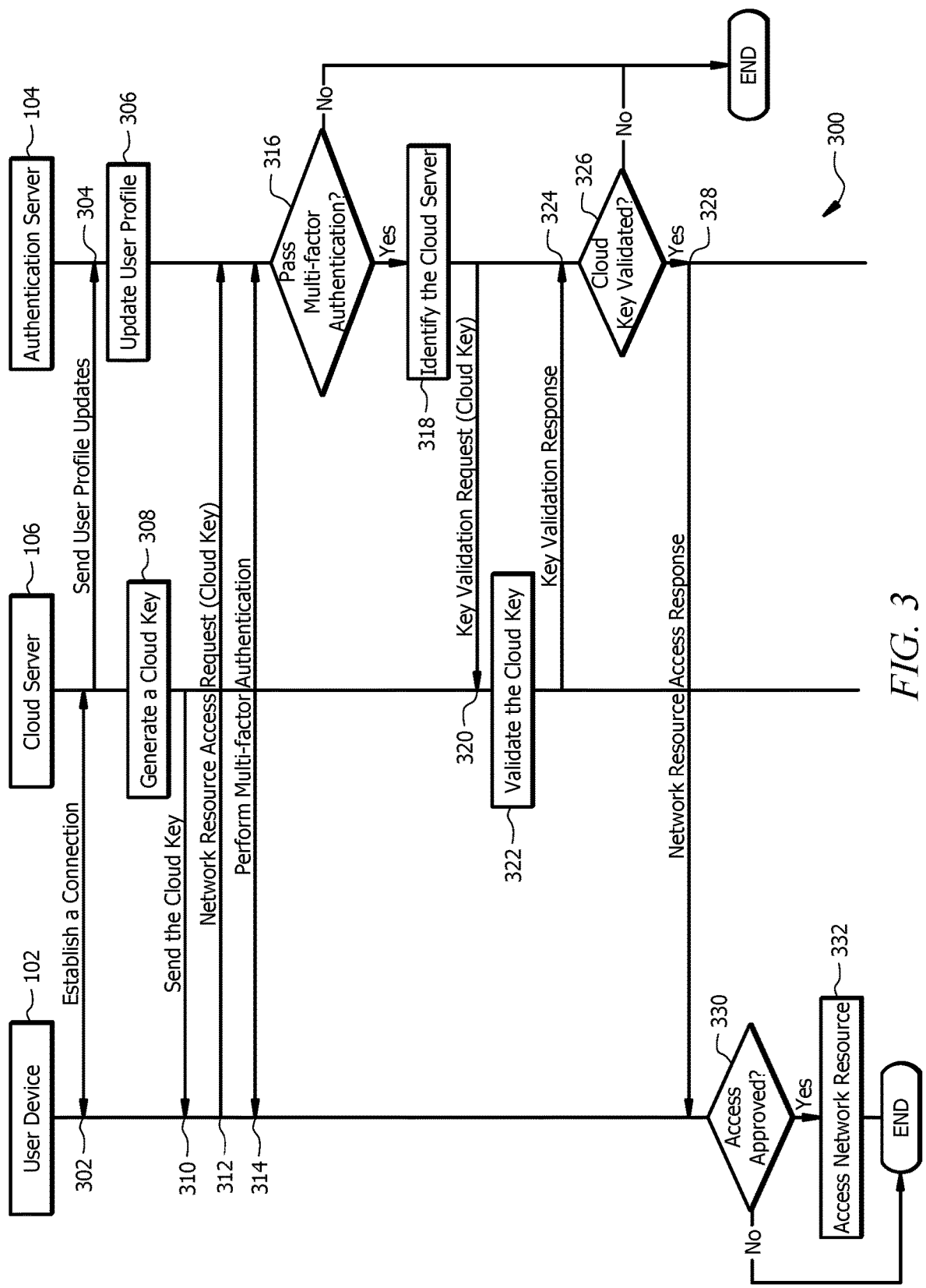
FIG. 3 is a protocol diagram of an embodiment of a cloud-based multi-factor authentication method.

FIG. 3 is a protocol diagram of an embodiment of a cloud-based multi-factor authentication method 300. The system 100 implemented method 300 to provide access control of network resources for user devices 102. Method 300 is an embodiment of a particular sequence of steps or rules that allows the system 100 achieve the previously described technical improvement that increases the security of the system and improves data access control by using information that cannot be stolen from the user in conjunction with multi-factor authentication. The following is a non-limiting example that illustrates how the system 100 implements method 300 to provide access control of network resources for a user device 102. In this example, a user 101 employs their user device 102 to access to a particular network resource (e.g. hardware resource or data) that requires a higher level of security authentication.

At step 302, the user device 102 established a connection with a cloud server 106. In one embodiment, establishing communications between the user device 102 and the cloud server 106 may comprise authenticating the user 101. The cloud server 106 may employ any suitable authentication protocol for authenticating the user 101 and establishing communications between the user device 102 and the cloud server 106. For example, the cloud server 106 may authenticate the user 101 based on log-in credentials provided by the user 101. As an example, the user device 102 may establish a hypertext transfer protocol (HTTP) or a hypertext transfer protocol secure (HTTPS) connection with the cloud server 106. In other examples, the user device 102 may establish communications with the cloud server 106 using any suitable technique or protocol as would be appreciated by one of ordinary skill in the art.

At step 304, the cloud server 106 sends a user profile update to the authentication server 104 in response to establishing the connection with the user device 102. In one embodiment, the cloud server 106 uses the log-in credentials provided by the user 101 to identify a user profile linked with the user 101. The cloud server 106 update its records with the new connection between the user device 102 and the cloud server 106. The cloud server 106 also sends a user profile update to the authentication server 104 that comprises information identifying the connection between the user device 102 and the cloud server 106. The user profile update may transmitted using any suitable format and/or type of message.

At step 306, the authentication server 104 updates a user profile linked with the user 101 of the user device 102 in response to receiving the user profile updates from the cloud server 106. For example, the authentication server 104 may update the user profile to indicate the user device 102 is currently connected to the cloud server 106. The user profile may comprise any suitable information for identifying the cloud server 106. For instance, the user profile may comprise a media access control (MAC) address, an Internet protocol (IP) address, a port identifier, a virtual machine identifier, or any other suitable type of identifier identifying the cloud server 106. Updating the user profile may comprise modifying entries in a data structure (e.g. a table) or file that comprises information linked with the user 101.

At step 308, the cloud server 106 generates a cloud key 112. The cloud key 112 is uniquely linked with the user 101 and the cloud server 106 that generates the cloud key 112. In one embodiment, the cloud server 106 may generate a tokenized key based on information linked with the user 101 and/or the identity of the cloud server 106. For example, the cloud server 106 may use a hashing function on information from the user profile linked with the user 101 to generate the cloud key 112. In other examples, the cloud server 106 generates the cloud key 112 using any other suitable technique. In one embodiment, the cloud server 106 may generate a cloud key 112 that expires after a predetermined amount of time. For example, the cloud server 106 may set a timer for the cloud key 112 that tracks the time interval where the cloud key 112 is valid.

In one embodiment, the cloud server 106 may generate a cloud key 112 based on information from a previous connection or session with the user device 102. For example, the cloud server 106 may have generated a cloud key 112 with a token value of "123456" for a previous connection with the user device 102. The cloud server 106 may reuse a portion (e.g. "456") of the previous token to generate a new cloud key 112. For instance, the cloud server 106 may generate a new cloud key 112 with a token value of "456789." In other examples, the cloud server 106 may generate the cloud key 112 using any other portion of the previous cloud key token.

At step 310, the cloud server 106 sends the cloud key 112 to the user device 102. For example, the cloud server 106 may send the cloud key 112 during the handshake protocol when establishing the connection between the user device 102 and the cloud server 106. As another example, the cloud server 106 may send the cloud key 112 as a message once the connection between the user device 102 and the cloud server 106 is established. As another example, the cloud server 106 may provide a link where the user 101 can download the cloud key 112. As another example, the cloud server 106 may prompt the user 101 with the cloud key 112 as alphanumeric text on the display of the user device 102, for example in an application or browser window. In other examples, the cloud server 106 may send the cloud key 112 to the user device 102 using any suitable technique. In one embodiment, the user 101 may employ the user device 102 to copy the cloud key 112 to a portable external device (e.g. USB device).

At step 312, the user device 102 sends a network resource access request to the authentication server 104. For example, the user 101 may want to access a file in a restricted database or to access a network resource that requires a higher level of authentication before providing access to the user 101. In one embodiment, the user device 102 sends a message to the authentication server 104 that comprises the cloud key 112. The user device 102 may send the message using any suitable technique and/or protocol. In one embodiment, the user 101 may provide the cloud key 112 to the authentication server 105 using a portable external device (e.g. USB device). In one embodiment, the user 101 may provide the cloud key 112 to the authentication server 105 using NFC, Bluetooth, radio-frequency identification (RFID), or any other suitable wireless technology. In other examples, the user device 102 provides the cloud key 112 to the authentication server 106 using any other suitable technique.

At step 314, the authentication server 104 performs multi-factor authentication with the user device 102 in response to receiving the network resource access request. For example, the authentication server 104 may interrogate user 101 via the user device 102 to authenticate the user 101. The multi-factor authentication may comprise biometric authentication (e.g. finger print or retinal scans), geolocation based authentication (e.g. near field communications (NFC) or global positioning system (GPS)), authenticating user credentials (e.g. username and password), authenticating security tokens, answering security questions, any other suitable type of authentication technique, or combinations, thereof. For example, the multi-factor authentication may comprise determining the geographical location of the user device 102 and comparing the location of the user device 102 with known locations for the user device 102 based on the user profile linked with the user 101. In this example, the geographical location may be based on GPS data and/or a network connection for the user device 102. The multi-factor authentication may comprise any suitable type and/or number of authentication steps or levels.

At step 316, the authentication server 104 determines whether the user 101 of the user device 102 has passed multi-factor authentication. The authentication server 104 proceeds to step 318 in response to determining that the user 101 of the user device 102 has passed multi-factor authentication. Otherwise, the authentication server 104 terminates method 300. When the authentication server 104 terminates method 300, the authentication server 104 does not allow the user device 102 to access to the requested network resource. In some embodiments, the authentication server 104 sends a network access request response that indicates the authentication server 104 has denied access to the requested network resource.

At step 318, the authentication server 104 identifies the cloud server 106 connected to the user device 102. For example, the authentication server 104 may access the user profile linked with the user 101 of the user device 102 to identify the cloud server 106 currently connected to the user device 102. The user profile may use any suitable identifier to identify the cloud server 106. At step 320, the authentication server 104 sends a key validation request to the cloud server 106 that comprises the cloud key 112. The authentication server 104 sends the key validation request to the cloud server 106 to trigger the cloud server 106 to validate the cloud key 112.

At step 322, the cloud server 106 validates the cloud key 112. Validating the cloud key 112 comprises determining whether the cloud server 106 generated the cloud key 112 and determining whether the cloud key 112 is valid. In one embodiment, the cloud server 106 keeps a record of generated cloud keys 112. The cloud server 106 is configured to look up a received cloud key 112 to determine whether the cloud server 106 generated the cloud key 112. In another embodiment, the cloud server 106 is configured to process (e.g. unhash) the cloud key 112 to determine whether the cloud server 106 generated the cloud key 112. The cloud server 106 may perform any suitable processing techniques on the cloud key 122 to determine whether the cloud server 106 generated the cloud key 112. In one embodiment, when the cloud key 112 is configured to expire after a predetermined amount of time, the cloud server 106 verifies whether the cloud key 112 has already expired. For example, the cloud server 106 may check any timers linked with the cloud key 112.

At step 324, the cloud server 106 sends a key validation response to the authentication server 104. The key validation response indicates whether the cloud key 112 has passed validation. The cloud server 106 sends a key validation response that indicates the cloud key 112 has passed verification when the cloud server 106 determines that the cloud server 106 generated the cloud key 112 and the cloud key 112 is valid. The cloud server 106 sends a key validation response that indicates the cloud key 112 has not passed verification when the cloud server 106 determines that the cloud server 106 did not generate the cloud key 112, the cloud key 112 is not valid, or the cloud key 112 has expired. The cloud server 104 may send the key validation response using any suitable technique and/or protocol.

At step 326, the authentication server 104 determines whether the cloud server 106 has validated the cloud key 112. The authentication server 104 proceeds to step 328 in response to determining that the cloud server 106 has validated the cloud key 112. Otherwise, the authentication server 104 terminates method 300. When the authentication server 104 terminates method 300, the authentication server 104 does not allow the user device 102 to access to the requested network resource. In some embodiments, the authentication server 104 sends a network access request response that the authentication server 104 has denied access to the requested network resource.

At step 328, the authentication server 104 send a network resource access response to the user device 102. The network resource access response indicates whether the authentication server 104 has been approved access to the request network resource. The authentication server 104 sends a network resource access response that approves access the requested network resource when the user 101 has passed multi-factor authentication and the cloud key 112 has passed validation by the cloud server 106. The authentication server 104 sends a network resource access response that denies access the requested network resource when the user 101 has failed multi-factor authentication or the cloud key 112 has failed validation by the cloud server 106. The authentication server 104 may send the network resource access response using any suitable technique and/or protocol.

At step 330, the user device 102 determines whether the user device 102 has received approval to access the requested network resource. The user device 102 proceeds to step 322 in response to determining that the user device has received approval to access the requested network resource. Otherwise, the user device 102 terminates method 300 in response to the authentication server 104 denying access to the requested network resource.

At step 322, the user device 102 is able to access the requested network resource. In other words, the user device 102 is granted access to the data and/or network resource that was request in step 312.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A network multi-factor authentication system, comprising:
   a plurality of cloud servers, wherein a first cloud server from the plurality of cloud servers is configured to:
      establish a connection with a user device;
      generate a cloud key in response to establishing a connection with a user device, wherein the cloud key is uniquely linked with a user associated with the user device and the first cloud server that generated the cloud key;
      send the cloud key to the user device connected to the first cloud server; and
      send a user profile update to an authentication server that indicates the user device is currently connected to the first cloud server; and
   the authentication server in signal communication with the plurality of cloud servers, comprising:
      a memory operable to store a user profile for the user of the user device, wherein:
         the user profile is uniquely linked with the user; and
         the user profile identifies which cloud server from among the plurality of cloud servers that the user device is currently connected to; and
      a network resource access engine implemented by a processor, configured to:
         receive a network resource access request comprising the cloud key from the user device, wherein the network resource access request requests access to a network resource;
         perform multi-factor authentication with the user associated with the user device in response to receiving the cloud key, wherein performing multi-factor authentication comprises:
            determining a location of the user device; and
            comparing the determined location with known locations for the user device based on the user profile linked with the user;
         access the user profile for the user in response to determining that the user passes the multi-factor authentication;
         determine that the user device is currently connected to the first cloud server based on the user profile;
         send a key validation request comprising the cloud key to the first cloud server;
         receive a key validation response from the first cloud server in response to sending the key validation request;
         determine the cloud key passes verification based on the key validation response; and
         send a network resource access response to the user device, wherein the network resource access response indicates the user device is approved to access the network resource.

2. The system of claim 1, wherein the cloud key expires after a predetermined amount of time.

3. The system of claim 1, wherein the cloud key is generated at least in part on information from the user profile linked with the user.

4. The system of claim 1, wherein:
   the network resource access request is received on a first communication channel between the first cloud server and the authentication server;
   the validation request is sent on a second communication channel between the first cloud server and the authentication server; and
   the first communication channel and the second communication channel are different channels.

5. The system of claim 1, wherein performing multi-factor authentication comprises biometric authentication.

6. A network multi-factor authentication method, comprising:
   receiving a user profile update from a first cloud server indicating a user device is currently connected to the first cloud server from among a plurality of cloud servers;
   updating a user profile for a user, wherein:
      the user profile is uniquely linked with the user; and
      the user profile identifies which cloud server from among the plurality of cloud servers that the user device is currently connected to;
   receiving a network resource access request comprising a cloud key from the user device, wherein:
      the cloud key is uniquely linked with the user associated with the user device and the first cloud server that generated the cloud key; and
      the network resource access request requests access to a network resource;
   performing multi-factor authentication with the user associated with the user device in response to receiving the cloud key, wherein performing multi-factor authentication comprises:
      determining a location of the user device; and
      comparing the determined location with known locations for the user device based on the user profile linked with the user;
   accessing the user profile for the user in response to determining that the user passes the multi-factor authentication;
   determining that the user device is currently connected to the first cloud server based on the user profile;
   sending a key validation request comprising the cloud key to the first cloud server;
   receiving a key validation response from the first cloud server in response to sending the key validation request;
   determining the cloud key passes verification based on the key validation response; and
   sending a network resource access response to the user device, wherein the network resource access response indicates the user device is approved to access the network resource.

7. The method of claim 6, wherein the cloud key expires after a predetermined amount of time.

8. The method of claim 6, wherein the cloud key is generated at least in part on information from the user profile linked with the user.

9. The method of claim 6, wherein:
the network resource access request is received on a first communication channel between the first cloud server and an authentication server;
the validation request is sent on a second communication channel between the first cloud server and the authentication server; and
the first communication channel and the second communication channel are different channels.

10. The method of claim 6, wherein performing multi-factor authentication comprises biometric authentication.

11. A network multi-factor authentication device, comprising:
a memory operable to store a user profile for a user of a user device, wherein:
the user profile is uniquely linked with a user; and
the user profile identifies which cloud server from among a plurality of cloud servers that the user device is currently connected to: and
a network resource access engine implemented by a processor, configured to:
receive a user profile update from a first cloud sever indicating the user device is currently connected to the first cloud server from among the plurality of cloud servers;
receive a network resource access request comprising a cloud key from the user device, wherein:
the cloud key is uniquely linked with the user associated with the user device and the first cloud server which generated the cloud key; and
the network resource access request requests access to a network resource;
perform multi-factor authentication with the user associated with the user device in response to receiving the cloud key, wherein performing multi-factor authentication comprises:
determining a location of the user device; and
comparing the determined location with known locations for the user device based on the user profile linked with the user;
access the user profile for the user in response to determining that the user passes the multi-factor authentication;
determine that the user device is currently connected to the first cloud server based on the user profile;
send a key validation request comprising the cloud key to the first cloud server;
receive a key validation response from the first cloud server in response to sending the key validation request;
determine the cloud key passes verification based on the key validation response; and
send a network resource access response to the user device, wherein the network resource access response indicates the user device is approved to access the network resource.

12. The device of claim 11, wherein the cloud key expires after a predetermined amount of time.

13. The device of claim 11, wherein:
the network resource access request is received on a first communication channel between the first cloud server and the authentication server;
the validation request is sent on a second communication channel between the first cloud server and the authentication server; and
the first communication channel and the second communication channel are different channels.

14. The device of claim 11, wherein performing multi-factor authentication comprises biometric authentication.

\* \* \* \* \*